(12) United States Patent
Lee et al.

(10) Patent No.: US 11,546,731 B2
(45) Date of Patent: Jan. 3, 2023

(54) LOCATING WIRELESS DEVICES

(71) Applicant: Cochlear Limited, Macquarie University (AU)

(72) Inventors: Hieu Lee, Mosman (AU); Daniel Ross Smith, North Ryde (AU); Ryan Orin Melman, South Coogee (AU); Ricardo Sarmiento, Eastwood (AU)

(73) Assignee: Cochlear Limited, Macquarie University (AU)

( * ) Notice: Subject to any disclaimer, the term of this patent is extended or adjusted under 35 U.S.C. 154(b) by 2 days.

(21) Appl. No.: 16/975,809

(22) PCT Filed: Feb. 19, 2019

(86) PCT No.: PCT/IB2019/051328
§ 371 (c)(1),
(2) Date: Aug. 26, 2020

(87) PCT Pub. No.: WO2019/166917
PCT Pub. Date: Sep. 6, 2019

(65) Prior Publication Data
US 2020/0413224 A1     Dec. 31, 2020

Related U.S. Application Data

(60) Provisional application No. 62/636,393, filed on Feb. 28, 2018.

(51) Int. Cl.
*H04W 4/029*     (2018.01)
*H04B 17/318*    (2015.01)
*H04W 4/02*      (2018.01)

(52) U.S. Cl.
CPC .......... *H04W 4/029* (2018.02); *H04B 17/318* (2015.01); *H04W 4/026* (2013.01)

(58) Field of Classification Search
CPC ..... H04W 4/029; H04W 4/026; H04B 17/318
(Continued)

(56) References Cited

U.S. PATENT DOCUMENTS 5,721,783 A    2/1998 Anderson
6,297,737 B1   10/2001 Irvin
(Continued)

FOREIGN PATENT DOCUMENTS

EP          2952856 A3      3/2016
WO     WO-2009154484 A2 *  12/2009 ............. G06Q 10/10
WO          2012167840 A1  12/2012

OTHER PUBLICATIONS

International Search Report and Written Opinion received in international app. No. PCT/IB2019/051328 dated Jun. 27, 2019 (7 pages).

(Continued)

*Primary Examiner* — Ted M Wang
(74) *Attorney, Agent, or Firm* — Edell, Shapiro & Finnan, LLC

(57) ABSTRACT

Techniques for locating a misplaced primary wireless device within a spatial region. In particular, the techniques presented herein use a secondary wireless device to collect a plurality of multivariate wireless data points within the spatial region. An artificially intelligent search algorithm analyzes the plurality of multivariate wireless data points to estimate the location of the wireless device. Directional instructions that guide the user to the estimated location of the primary wireless device are generated and then provided to the user.

20 Claims, 9 Drawing Sheets

(58) Field of Classification Search
USPC .................................................. 455/456.1
See application file for complete search history.

(56) References Cited

U.S. PATENT DOCUMENTS

| | | |
|---|---|---|
| 8,189,835 B2 | 5/2012 | Dietz |
| 8,363,868 B2 | 1/2013 | Fusakawa |
| 9,078,074 B2 | 7/2015 | Sorensen |
| 9,191,756 B2 | 11/2015 | Neumeyer |
| 9,591,453 B1 | 3/2017 | Hyde et al. |
| 9,596,551 B2 | 3/2017 | Pedersen |
| 9,706,357 B2 | 7/2017 | Heo |
| 9,841,814 B1* | 12/2017 | Kallmeyer ............. G06V 40/18 |
| 2005/0168338 A1 | 8/2005 | Parker |
| 2014/0045518 A1 | 2/2014 | Sathyan |
| 2014/0162701 A1 | 6/2014 | Jellinek et al. |
| 2016/0323708 A1 | 11/2016 | Sahadi et al. |
| 2016/0345137 A1 | 11/2016 | Ruiz |
| 2017/0257839 A1 | 9/2017 | Alles et al. |
| 2019/0201155 A1* | 7/2019 | Gupta ....................... G06T 7/33 |
| 2021/0020274 A1* | 1/2021 | Liu ........................ G16H 10/60 |

OTHER PUBLICATIONS

Extended European Search Report in counterpart European Application No. 19760845.8-1213, dated Oct. 14, 2021, 9 pages.

* cited by examiner

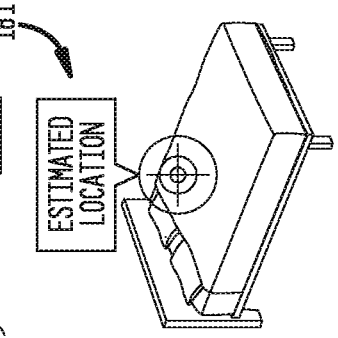
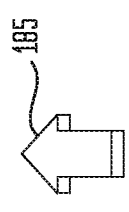
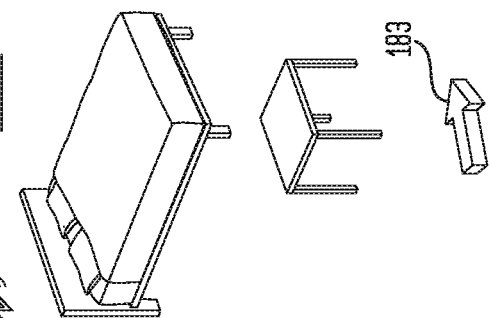
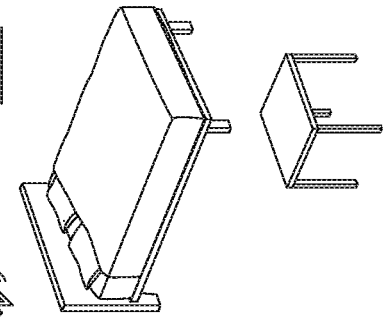
FIG. 3A  FIG. 3B  FIG. 3C

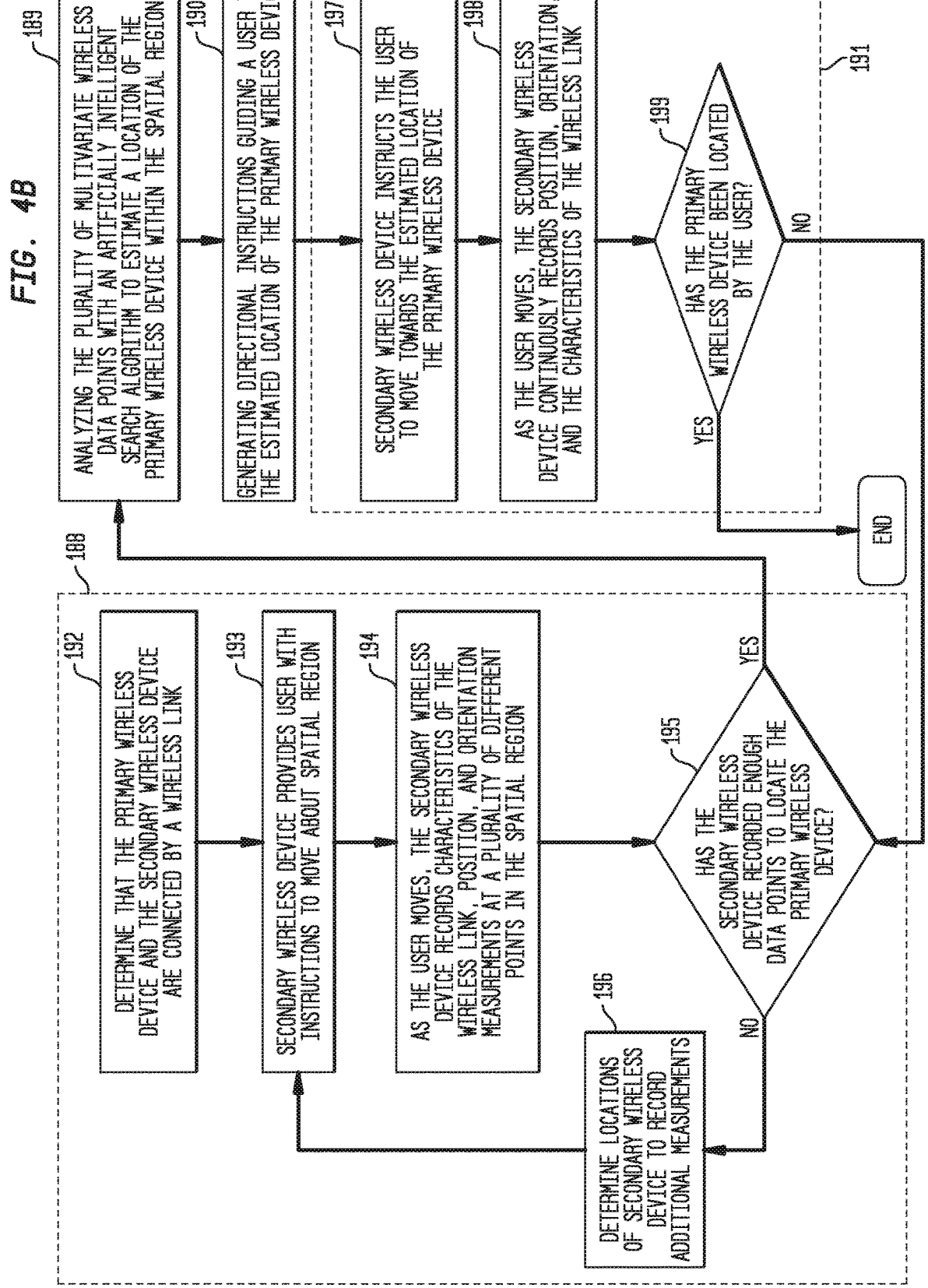

LOCATING WIRELESS DEVICES

BACKGROUND

Field of the Invention

The present invention relates generally to techniques for locating wireless devices.

Related Art

Medical devices having one or more implantable components, generally referred to herein as implantable medical devices, have provided a wide range of therapeutic benefits to recipients over recent decades. In particular, partially or fully-implantable medical devices such as hearing prostheses (e.g., bone conduction devices, mechanical stimulators, cochlear implants, etc.), implantable pacemakers, defibrillators, functional electrical stimulation devices, and other implantable medical devices, have been successful in performing lifesaving and/or lifestyle enhancement functions for a number of years.

The types of implantable medical devices and the ranges of functions performed thereby have increased over the years. For example, many implantable medical devices now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process.

SUMMARY

In one aspect a method is provided. The method comprises: collecting, via a secondary wireless device disposed in a same spatial region as a primary wireless device, a plurality of multivariate wireless data points associated with a direct wireless link between the primary wireless device and the secondary wireless device; analyzing the plurality of multivariate wireless data points with an artificially intelligent search algorithm to estimate a location of the primary wireless device within the spatial region; generating directional instructions guiding a user to the estimated location of the primary wireless device; and providing, via the secondary wireless device, the directional instructions to the user.

In another aspect a method is provided. The method comprises: at each of a plurality of location points within a spatial region, measuring at least one characteristic of a direct wireless link between a primary wireless device and a secondary wireless device; at each of the plurality of location points, recording an indication of the orientation and location point of the secondary wireless device at the time the at least one characteristic is measured; generating, based on analysis of the at least one characteristic of a direct wireless link and the orientation of the secondary wireless device at each of the plurality of location points, an estimated location of the primary wireless device in the spatial region; generating directional instructions guiding a user to the estimated location of the primary wireless device; and providing, via the secondary wireless device, the directional instructions to the user.

BRIEF DESCRIPTION OF THE DRAWINGS

Embodiments of the present invention are described herein in conjunction with the accompanying drawings, in which:

FIGS. 3A, 3B, and 3C are schematic diagrams illustrating search information provided to a user to locate a misplaced primary wireless, in accordance with certain embodiments presented herein;

FIG. 4B is a flowchart illustrating further details of the method of FIG. 4A, in accordance with embodiments presented herein.

DETAILED DESCRIPTION

Figure 1A:
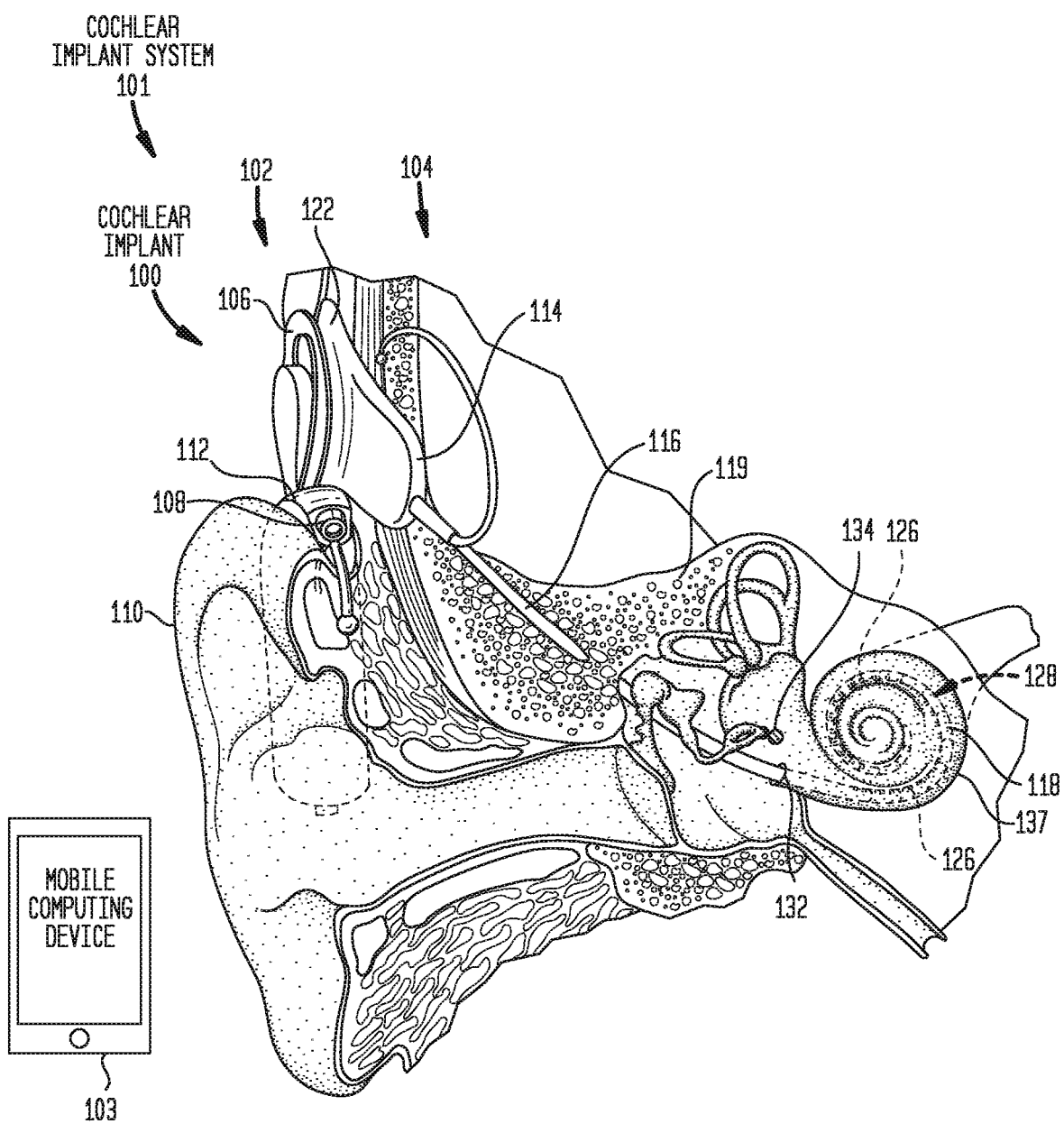
FIG. 1A is a schematic diagram illustrating a cochlear implant system comprising a cochlear implant and mobile computing device, in accordance with certain embodiments presented herein.

Implantable medical devices are devices that include one or more components permanently or temporarily implanted within the body of a recipient. It is common for implantable medical devices to also include, or operate in conjunction with, one or more external components/devices. In general, an external component provides functionality (e.g., processing capabilities, battery charging, etc.) that ensures proper operation of the associated implantable components. As a result, the external component is typically worn or carried by the recipient and can be taken to any of a number of different places, such as school, work, sporting events, etc. This need to keep the external component with the recipient results in an increased risk that the external component will be lost, stolen, or otherwise misplaced.

Attempts have been made to assist users with locating lost, stolen, or misplaced electronic devices. However, these conventional techniques are unsatisfactory for a number of reasons. In particular, certain conventional techniques require the user to make difficult decisions and/or to interpret non-intuitive location data. With these conventional techniques, if the user makes an incorrect decision, or incorrectly interprets the location data, then the user can have considerable difficulty locating the misplaced device. Other conventional techniques rely primarily on satellite positioning systems to provide a user with an indication of a general/vague (i.e., relatively large area in which the misplaced device may be located. The United States NAVSTAR Global Positioning System (GPS) satellites, for example, broadcast their signals in space with a global average user range error (URE) of ≤7.8 meters (25.6 feet), with 95% probability. However, the actual accuracy of the GPS signals at a receiving device depends on additional factors, including satellite geometry, signal blockage, atmospheric conditions, and receiver design features/quality. For example, GPS-enabled devices can generate location information which is typically accurate to within 4.9 meters (16 feet) radius under open sky, but this accuracy decreases near buildings, bridges, and trees, or when the GPS-enabled device is located indoors. As such, using a GPS approach, the user can be positioned in the general vicinity of a misplaced device, but still have considerable difficulty in actually locating the device within the general vicinity, particularly if the lost device is located inside a building and/or when the GPS provided location is inaccurate by 15 feet, 20 feet, or even 25 feet.

Presented herein are techniques for locating a misplaced primary wireless device (i.e., a device that is configured to transmit a wireless signal) within a spatial region without the above and other issues associated with conventional techniques. In particular, the techniques presented herein use a secondary wireless device to collect a plurality of "multivariate wireless data points" within the spatial region. Each multivariate wireless data point comprises at least one measured characteristic (e.g., signal strength) of a direct wireless link between the primary wireless device and the secondary wireless device, coupled with the position of the secondary wireless device and the orientation of the secondary wireless device when the at least one characteristic of the direct wireless link is measured. An artificially intelligent search algorithm analyzes the plurality of multivariate wireless data points to estimate the location of the wireless device. Directional instructions that specifically guide the user to the estimated location of the primary wireless device are generated and provided to the user. As such, the techniques presented herein are superior to conventional device techniques in that the user is provided with a precise location of a primary electronic wireless device and is guided to the precise location (e.g., within one hundred (100) centimeters, fifty (50) centimeters, or less) without the need for the user to interpret any location data. As described further below, the accuracy of the techniques presented herein may vary depending on the specific algorithm used and the parameters thereof (e.g., the number of particles used in a particle filter), but the techniques presented herein may be used both outdoors and indoors (or other situations where GPS is unavailable and/or unreliable).

As described further below, certain embodiments use a combination of location information sources to accommodate situations in which the user may be positioned a significant distance from the electronic wireless device or within a close proximity to the external wireless device.

Merely for ease of illustration, the techniques presented herein are primarily described with reference to locating a specific primary wireless device, namely the external component of an implantable medical device and, more particularly, the external component of a cochlear implant. However, it is to be appreciated that the techniques presented herein may be used to locate a number of different types of wireless devices. For example, the techniques presented herein could be implemented in systems comprising other partially or fully implantable medical devices, including other auditory prostheses (e.g., auditory brainstem stimulators, electro-acoustic hearing prostheses, middle ear prostheses, direct cochlear stimulators, bimodal hearing prostheses, etc.), pain relief implants, pacemakers, etc. In other examples, the techniques presented herein could be implemented to locate consumer wireless devices (e.g., smart phones, smart watches, tablet computers, etc.).

In addition, also merely for ease of illustration, the techniques presented herein are primarily described with reference to locating the external component of the cochlear implant with a specific secondary wireless device, namely a mobile phone. However, it is to be appreciated that the techniques presented herein may be used with other types of secondary wireless devices, such as tablet computers, laptop computers, etc.

Figure 1B:
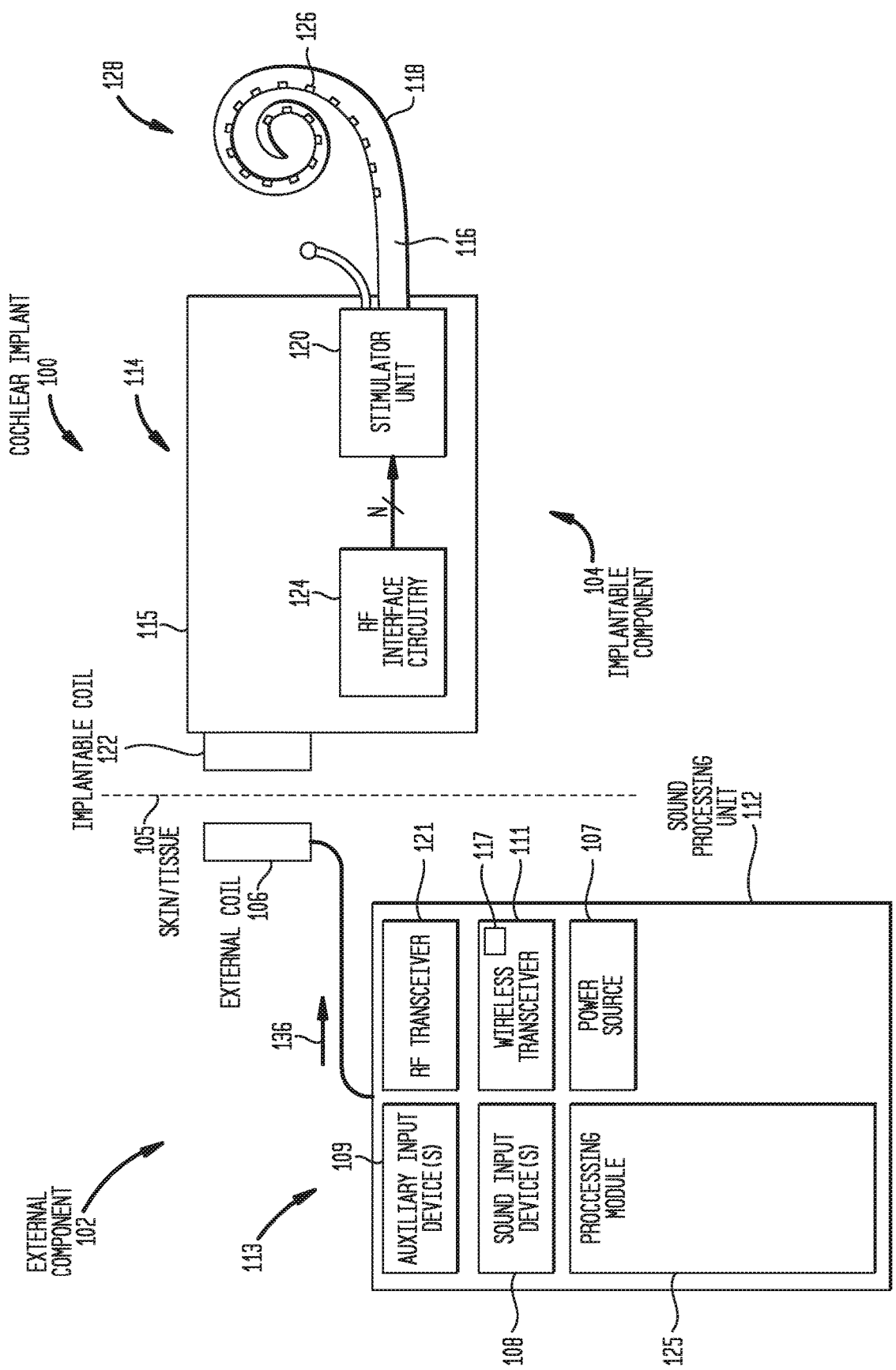
FIG. 1B is a block diagram of the cochlear implant of FIG. 1A.
Figure 1C:
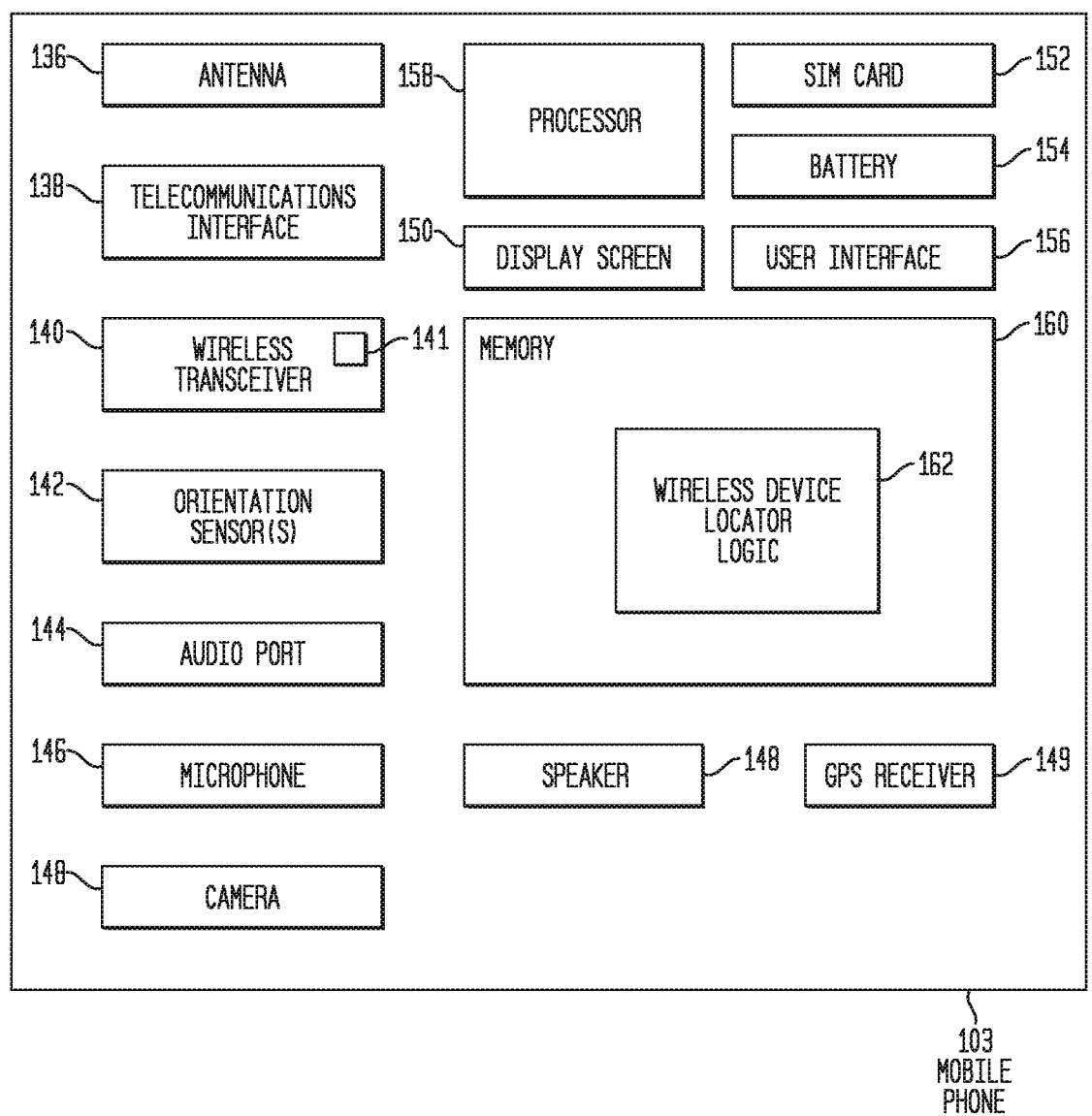
FIG. 1C is a block diagram of the mobile computing device of FIG. 1A.

Shown in FIGS. 1A, 1B, and 1C is an exemplary cochlear implant system 101 configured to execute the techniques presented herein. More particularly, FIG. 1A is a schematic diagram of the exemplary cochlear implant system 101 comprising a cochlear implant 100 and a mobile computing device 103. FIG. 1B is a block diagram illustrating one example arrangement of the cochlear implant 100, while FIG. 1C is a block diagram illustrating one example arrangement of the mobile computing device 103. For ease of illustration, FIGS. 1A and 1B will be described together, followed by a description of FIG. 1C.

The cochlear implant 100 comprises an external component 102 and an internal/implantable component 104. The external component 102 is configured to be directly or indirectly attached to the body of the recipient and typically comprises an external coil 106 and, generally, a magnet (not shown in FIG. 1) fixed relative to the external coil 106. The external component 102 also comprises one or more input elements/devices 113 for receiving input signals at a sound processing unit 112. In this example, the one or more one or more input devices 113 include sound input devices 108 (e.g., microphones positioned by auricle 110 of the recipient, telecoils, etc.) configured to capture/receive input signals, one or more auxiliary input devices 109 (e.g., audio ports, such as a Direct Audio Input (DAI), data ports, such as a Universal Serial Bus (USB) port, cable port, etc.), and a wireless transmitter/receiver (transceiver) 111, each located in, on, or near the sound processing unit 112.

The wireless transceiver 111 may have a number of different arrangements. In one example, the wireless transceiver 111 includes an integrated antenna 117 and may be configured to operate in accordance with the Bluetooth® or other short-range wireless technology standard that enables the sound processing unit 112 to wirelessly communicate with another device (i.e., receive and transmit data to/from another device via a wireless connection using, for example, 2.4 Gigahertz (GHz) Ultra high frequency (UHF) radio waves, 5 GHz Super high frequency (SHF) radio waves, etc.). Bluetooth® is a trademark of Bluetooth Special Interest Group (SIG), Inc. It is to be appreciated that reference to the Bluetooth® standard is merely illustrative and that the wireless transceiver 111 may make use of any other wireless standard now known or later developed.

The sound processing unit 112 also includes, for example, at least one power source (e.g., battery) 107, a radio-frequency (RF) transceiver 121, and a processing module 125. The processing module 125 may be formed by one or more processors (e.g., one or more Digital Signal Processors (DSPs), one or more uC cores, etc.), firmware, software, etc. arranged to perform operations described herein. That is, the processing module 125 may be implemented as firmware elements, partially or fully implemented with digital logic gates in one or more application-specific integrated circuits (ASICs), partially or fully in software, etc.

In the examples of FIGS. 1A and 1B, the external component 102 comprises a behind-the-ear (BTE) sound processing unit 112 configured to be attached to, and worn adjacent to, the recipient's ear and a separate coil 106. However, it is to be appreciated that embodiments of the present invention may be implemented with systems that include other arrangements, such as systems comprising a button sound processing unit (i.e., a component having a generally cylindrical shape and which is configured to be magnetically coupled to the recipient's head and which includes an integrated coil), a mini or micro-BTE unit, an in-the-canal unit that is configured to be located in the recipient's ear canal, a body-worn sound processing unit, etc.

Returning to the example embodiment of FIGS. 1A and 1B, the implantable component comprises an implant body (main module) 114, a lead region 116, and an intra-cochlear stimulating assembly 118, all configured to be implanted under the skin/tissue (tissue) 105 of the recipient. The implant body 114 generally comprises a hermetically-sealed housing 115 in which RF interface circuitry 124 and a stimulator unit 120 are disposed. The implant body 114 also includes an internal/implantable coil 122 that is generally external to the housing 115, but which is connected to the RF interface circuitry 124 via a hermetic feedthrough (not shown in FIG. 1B).

As noted, stimulating assembly 118 is configured to be at least partially implanted in the recipient's cochlea 137. Stimulating assembly 118 includes a plurality of longitudinally spaced intra-cochlear electrical stimulating contacts (electrodes) 126 that collectively form a contact or electrode array 128 for delivery of electrical stimulation (current) to the recipient's cochlea. Stimulating assembly 118 extends through an opening in the recipient's cochlea (e.g., cochleostomy, the round window, etc.) and has a proximal end connected to stimulator unit 120 via lead region 116 and a hermetic feedthrough (not shown in FIG. 1B). Lead region 116 includes a plurality of conductors (wires) that electrically couple the electrodes 126 to the stimulator unit 120.

As noted, the cochlear implant 100 includes the external coil 106 and the implantable coil 122. The coils 106 and 122 are typically wire antenna coils each comprised of multiple turns of electrically insulated single-strand or multi-strand platinum or gold wire. Generally, a magnet is fixed relative to each of the external coil 106 and the implantable coil 122. The magnets fixed relative to the external coil 106 and the implantable coil 122 facilitate the operational alignment of the external coil with the implantable coil. This operational alignment of the coils 106 and 122 enables the external component 102 to transmit data, as well as possibly power, to the implantable component 104 via a closely-coupled wireless link formed between the external coil 106 with the implantable coil 122. In certain examples, the closely-coupled wireless link is a radio frequency (RF) link. However, various other types of energy transfer, such as infrared (IR), electromagnetic, capacitive and inductive transfer, may be used to transfer the power and/or data from an external component to an implantable component and, as such, FIG. 1B illustrates only one example arrangement.

As noted above, sound processing unit 112 includes the processing module 125 configured to perform a number of operations. More specifically, the processing module 125 is configured to convert input audio signals into stimulation control signals 136 for use in stimulating a first ear of a recipient (i.e., the processing module 125 is configured to perform sound processing on input audio signals received at the sound processing unit 112). The input audio signals that are processed and converted into stimulation control signals may be audio signals received via the sound input devices 108, signals received via the auxiliary input devices 109, and/or signals received via the wireless transceiver 111.

In the embodiment of FIG. 1B, the stimulation control signals 136 are provided to the RF transceiver 121, which transcutaneously transfers the stimulation control signals 136 (e.g., in an encoded manner) to the implantable component 104 via external coil 106 and implantable coil 122. That is, the stimulation control signals 136 are received at the RF interface circuitry 124 via implantable coil 122 and provided to the stimulator unit 120. The stimulator unit 120 is configured to utilize the stimulation control signals 136 to generate electrical stimulation signals (e.g., current signals) for delivery to the recipient's cochlea via one or more stimulating contacts 126. In this way, cochlear implant 100 electrically stimulates the recipient's auditory nerve cells, bypassing absent or defective hair cells that normally transduce acoustic vibrations into neural activity, in a manner that causes the recipient to perceive one or more components of the input audio signals. In addition to conversion of input audio signals into stimulation control signals 136, the processing module 125 is also configured to cause the sound processing unit 102 to transmit/emit wireless signals via, for example, the wireless transceiver 111. As described further below, these emitted wireless signals can be used by the mobile computing device 103 to determine the location of the external component 102.

As noted, FIGS. 1A, and 1B illustrate one example arrangement for the cochlear implant 100. However, it is to be appreciated that embodiments of the present invention may be implemented in cochlear implants having alternative arrangements. For example, it is to be appreciated that the use of an external component is merely illustrative and that the techniques presented herein may be used in arrangements having an implanted sound processor (e.g., totally implantable cochlear implants). It is also to be appreciated that the individual components referenced herein, e.g., sound input element 108 and the sound processor in sound processing unit 112, may be distributed across more than one tissue-stimulating prosthesis, e.g., two cochlear implants 102, and indeed across more than one type of device, e.g., cochlear implant 102 and a consumer electronic device or a remote control of the cochlear implant 102.

Also as noted above, cochlear implant system 101 includes a mobile computing device 103. The mobile computing device 103 is a portable electronic component capable of storing and processing electronic data and configured to communicate with the cochlear implant 100. Mobile computing device 103 may comprise, for example, a mobile or satellite "smart" phone, collectively and generally referred to herein simply as "mobile phones," a tablet computer, a personal digital assistant (PDA), a remote control device, or another portable personal device enabled with processing and communication capabilities.

FIG. 1C is a block diagram of an illustrative arrangement for mobile computing device 103, referred to as a mobile phone 103. It is to be appreciated that FIG. 1C is merely illustrative of one arrangement for a mobile computing device configured to execute techniques for described herein.

Mobile phone 103 comprises an antenna 136 and a telecommunications interface 138 that are configured for communication on a wireless communication network for telephony services (e.g., a Global System for Mobile Communications (GSM) network, code division multiple access (CDMA) network, time division multiple access (TDMA), or other kinds of networks). As shown in FIG. 1C, mobile phone 103 also includes a wireless transceiver 140 that may have a number of different arrangements. In one example, the wireless transceiver 140 includes an integrated antenna 141 and may be configured to operate in accordance with the Bluetooth® or other short-range wireless technology standard that enables the mobile phone 103 to wirelessly communicate with another device (i.e., receive and transmit data to/from another device via a wireless connection using, for example, 2.4 Gigahertz (GHz) Ultra high frequency (UHF) radio waves, 5 GHz Super high frequency (SHF) radio waves, etc.). It is to be appreciated that reference to the Bluetooth® standard is merely illustrative and that the wireless transceiver 140 may make use of any other wireless standard now known or later developed.

Mobile phone 103 also comprises one or more orientation sensors 142 (e.g., one or more of an accelerometer, a gyroscope, a magnetometer, etc.), an audio port 144, one or more sound input elements, such as a microphone 146, a speaker 148, a display screen 150, a subscriber identity module or subscriber identification module (SIM) card 152, a battery 154, a user interface 156, a satellite positioning system receiver/chip 149 (e.g., GPS receiver), a processor 158, and a memory 160 that comprises wireless device locator logic 162.

The display screen 150 is an output device, such as a liquid crystal display (LCD), for presentation of visual information to the user. The user interface 156 may take many different forms and may include, for example, a keypad, keyboard, mouse, touchscreen, display screen, etc. In one specific example, the display screen 150 and user interface 156 are combined to form a touch screen. More specifically, touch sensors or touch panels have become a popular type of user interface and are used in many types of devices. Touch panels recognize a touch input of a user and obtain the location of the touch to effect a selected operation. A touch panel may be positioned in front of a display screen, or may be integrated with a display screen. Such configurations, allow the user to intuitively connect a pressure point of the touch panel with a corresponding point on the display screen, thereby creating an active connection with the screen. In certain embodiments, display screen 150 is used to provide information to locate external component 102, as described further below.

Memory 160 may comprise read only memory (ROM), random access memory (RAM), magnetic disk storage media devices, optical storage media devices, flash memory devices, electrical, optical, or other physical/tangible memory storage devices. The processor 158 is, for example, a microprocessor or microcontroller that executes instructions for the wireless device locator logic 162. Thus, in general, the memory 160 may comprise one or more tangible (non-transitory) computer readable storage media (e.g., a memory device) encoded with software comprising computer executable instructions and when the software is executed (by the processor 158) it is operable to perform all or part of the device location techniques in accordance with presented herein. That is, the wireless device locator logic 162, when executed by processor 158 is a program/application configured to perform or enable one or more of operations described herein to locate another device, such as external component 102 of cochlear implant 100. As described further below, in certain embodiments, the wireless device locator logic 162 may include an artificially intelligent search algorithm that can be implemented to estimate a location of the external component 102 and to generate instructions at the mobile phone 103 guiding the user towards the estimated location of the external component.

As noted above, in the example of FIGS. 1A-1C, the external component 102 is worn by the recipient and provides processing functions for the cochlear implant 100. As such, the external component 102 is typically taken to any of a number of different places (e.g., school, work, etc.) and there is a possibility that the recipient (or other individual) could misplace the external component 102. Presented herein are techniques to automatically determine a precise/specific location of the external component 102 using the mobile phone 103 when the mobile phone is connected to the external component 102 via a direct wireless communications link (direct wireless link), such as via a Bluetooth® link. In operation, the user of the mobile phone 103 is instructed on where and how to move throughout the search process so that the precise location of the external component 102 can be determined without the need for the user to interpret location data.

Figure 2A:
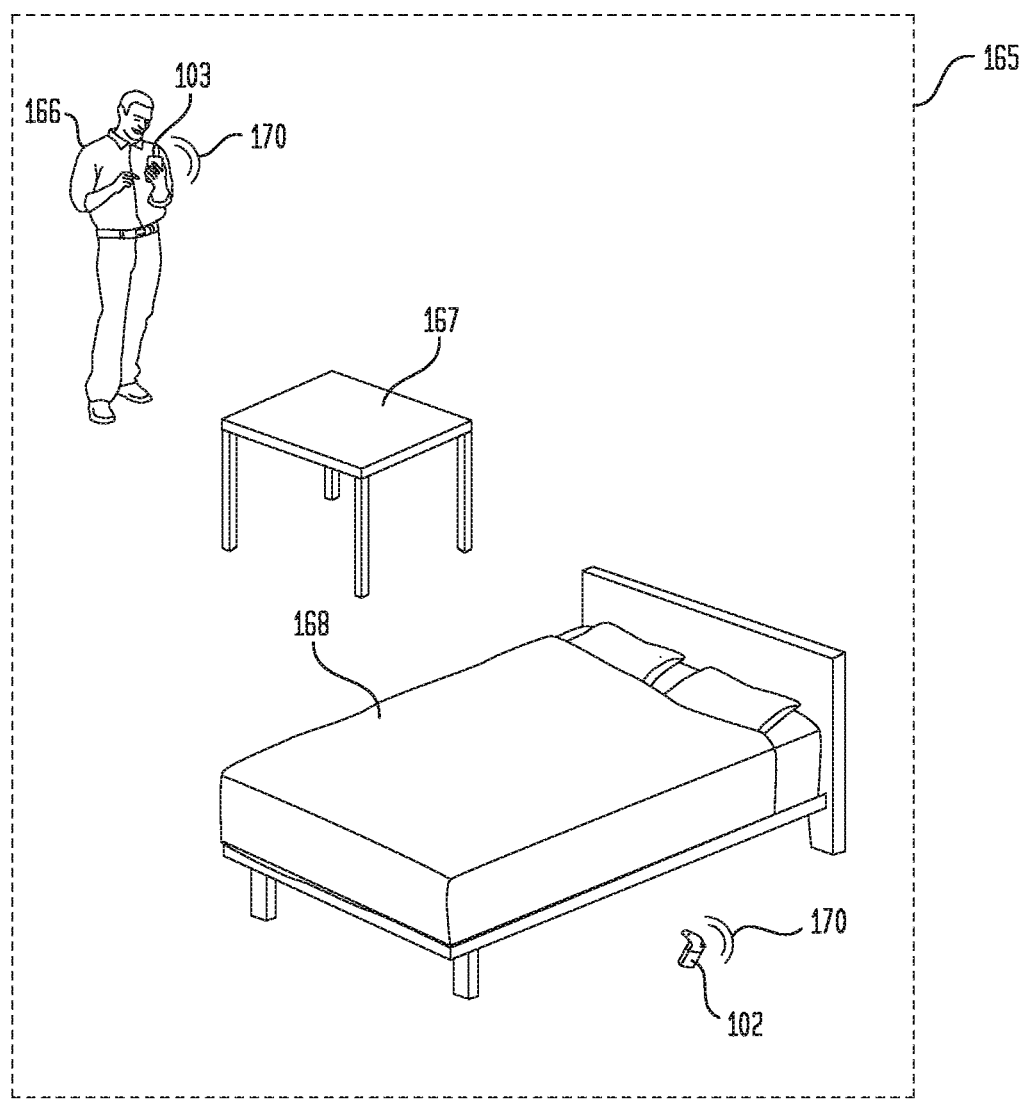
FIGS. 2A, 2B, and 2C are simplified schematic diagram illustrating a spatial region in which the techniques presented herein may be implemented to locate a misplaced primary wireless device.
Figure 2B:
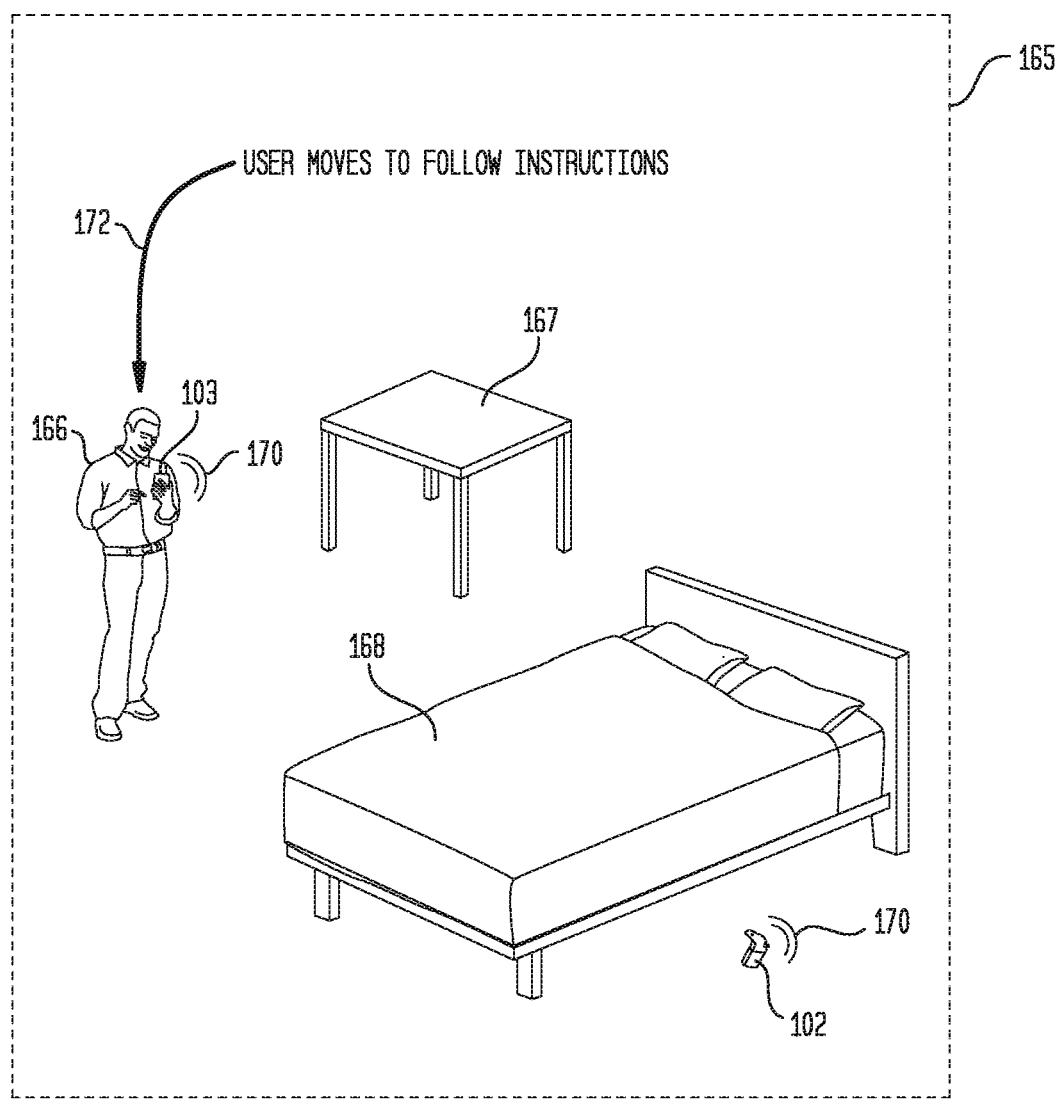
Figure 2C:
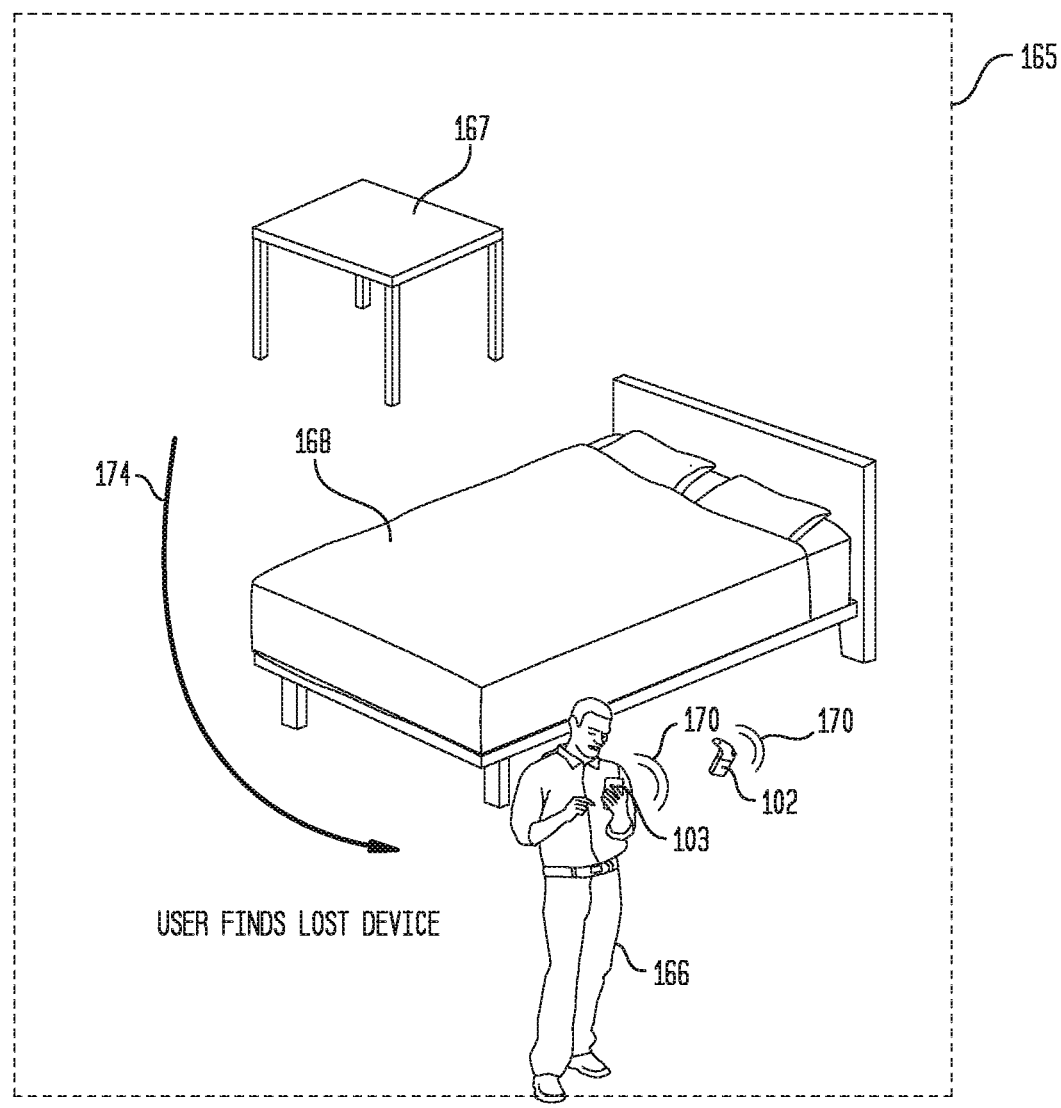

An example device search process in accordance with embodiments presented herein, sometimes referred to herein as a "primary wireless device search process," is described below with reference to FIGS. 2A, 2B, and 2C. More specifically, FIGS. 2A, 2B, and 2C are simplified schematic diagram illustrating a spatial area/region 165 (e.g., a room, home, apartment, office, park, etc.) in which a user 166, mobile phone 103, and external component 102 are all positioned/situated. However, at least initially, the exact location of the external component 102 within the spatial region 165 is unknown to the mobile phone 103 and to the user 166.

The mobile phone 103 and the external component 102 are within the "same" spatial region when the two devices are sufficiently close enough together so as to be connected by a direct wireless communications link. As used herein, a "direct wireless communications link" or "direct wireless link" is a short-range wireless connection formed directly between two devices that are in the same physical proximity. Once example of a direct wireless link is a Bluetooth® link. In FIGS. 2A-2C, the direct wireless link is represented by wireless signal lines 170 and, as such, is sometimes referred to as direct wireless link 170.

FIGS. 2A-2C illustrate an example in which the spatial region 165 is a room that includes several obstructions in the form of a table 167 and a bed 168. However, it is to be appreciated that the arrangement of FIGS. 2A-2C is illustrative and that the techniques presented herein may be implemented in any spatial region in which the mobile phone 103 and the external component 102 are connected with one another via the direct wireless link 170.

In certain examples, a search situation may arise when the user misplaces his/her external component 102, but knows it is nearby (within range of the direct wireless link 170). That is, the user 166 (and thus the mobile phone 103) may both be initially located in the spatial region 165. However, in other examples the user 166 may not be located in the spatial region 165 when it is determined that the external component 102 has been misplaced. That is, the external component 102 may have been misplaced beyond the range of the direct wireless link 170. In general, the primary wireless device search process presented herein is not initiated until the mobile phone 103 (secondary wireless device) is brought in close enough proximity of the external component 102 (primary wireless device) so that the mobile phone 103 is connected to the external component 102 via the direct wireless link 170. In certain such examples, a so-called "preliminary device search process" may be initiated to guide the user 166 to the spatial region 165.

One example preliminary device search process may make use of a satellite navigation/positioning system to determine the general/approximate location of the external component 102. Satellite positioning systems are known in the art and are not described in detail herein. However, it is to be appreciated that embodiments presented herein may make use of any of a number of different satellite positioning systems, such as the United States NAVSTAR Global Positioning System (GPS), the Russian Globalnaya navigatsionnaya sputnikovaya sistema (GLONASS), the Galileo global navigation system, the BeiDou Navigation Satellite System (BDS), the Compass global navigation system, the Indian Regional Navigation Satellite System (IRNSS), the Quasi- Zenith Satellite System (QZSS), etc.). For ease of illustration, embodiments will be described herein with specific reference to the GPS.

For example, the user 166 could open a GPS search application on the mobile phone 103 that previously saved the approximate location of the lost external component 102. Using the GPS search application, the user 166 moves to the GPS determined approximate location of the external component 102. At this point, the mobile phone 103 and the external component 102 are likely positioned in the same spatial region 165 such that the mobile phone 103 is able to wirelessly connect to the external component 102. As such, the user 166 now knows the external component 102 is located nearby, but does not know the exact location of the external component 102 within the spatial region 165.

Once the mobile phone 103 and the external component 102 are positioned in the same spatial region 165 (i.e., are sufficiently close enough together so as to be connected by the direct wireless link 170), the primary wireless device search process is initiated at the mobile phone 103. In certain embodiments, the primary wireless device search process can be initiated in response to a user input (e.g., touch input, voice input, etc.) at the mobile phone 103. In other embodiments, the device location process can be initiated automatically by the mobile phone 103 upon detection of one or more search initiation/trigger conditions indicating that the external component 102 has been misplaced. A variety of search trigger conditions may be used to automatically initiate the device location process. For example, since the mobile phone 103 and external component 102 are connected by the direct wireless link 170, in certain examples the external component 102 may send a message to the mobile phone 103 indicating that the external component 102 is misplaced. The external component 102 may send such a message when, for example, the external coil 106 has been disconnected from the implantable coil 122 for a predetermined period of time (e.g., for more than five (5) minutes) and the power source 107 is not being recharged. In another example, the external component 102 may begin receiving unusual audio due to, for example, being on the ground instead of on a user's head. The detection of such information may cause the external component 102 to send a message to the mobile phone 103 indicating that the external component 102 is misplaced. It is to be appreciated that the above examples are merely illustrative.

In certain embodiments, aspects of the primary wireless device search process are implemented through execution of the wireless device locator logic 162 by the processor 158 of the mobile phone 103. As described elsewhere herein, the wireless device locator logic 162 is an artificially intelligent application configured to determine the location of external component 102 and then to guide the user 166 towards the location of the external component 102. However, as described further below, it is to be appreciated that certain aspects of the primary wireless device search process may be performed at other devices and, as such, the examples of FIGS. 2A-2C are illustrative.

FIG. 2A illustrates the spatial region 165 at the initiation/beginning of the device location process, while FIGS. 2B and 2C illustrate subsequent stages of the device location process. More specifically, FIG. 2B illustrates a stage in which the mobile phone 103 (i.e., the wireless device locator logic 162) collects/obtains a plurality of "multivariate wireless data points" associated with the direct wireless link 170 between the external component 102 and the mobile phone 103. As used herein, a "multivariate wireless data point" is the value of at least one characteristics of the direct wireless link 170, such as the wireless signal strength, at a given point in space and orientation. Stated differently, a multivariate wireless data point includes at least three (3) pieces of data, including: (1) at least one measured characteristic (e.g., signal strength) of the direct wireless link 170, (2) an indication or value of the specific spatial point at which the at least one characteristic is measured (e.g., the XYZ location of the mobile phone 103 when the signal strength is measured), and (3) an indication or value the orientation of the mobile phone 103 when the at least one characteristics is measured. Although each multivariate wireless data point includes these three pieces of data, is to be appreciated that a multivariate wireless data point may also include other types of data that are relevant to the search process. For example, multivariate wireless data points may also include: data related to brightness and hue of light detected by the mobile phone 103 (particularly useful if the lost processor has a bright torch or similar thereon); image/video data captured by a camera of the mobile phone 103 (e.g., used in conjunction with accelerometer (position/movement) and gyroscope (rotation) data to orient the phone in a three-dimensional space or used for image recognition to locate landmarks, addresses, the lost processor, etc.); audio data captured by sound inputs of the mobile phone 103 (useful if lost device is emitting sound); acceleration/velocity information regarding movement of the mobile phone 103 (e.g., more acceleration decreases accuracy of location measurement); GPS location of phone mobile phone 103; data sent from the external component 102 to the phone over the direct wireless link 170, etc. It is to be appreciated that these examples are merely illustrative and that a variety of other types of data, including some detailed further below, could also be included in the multivariate wireless data points presented herein.

As described further below, the elements of the multivariate wireless data points (e.g., at least the signal characteristics, measuring device (mobile phone) position, and measuring device orientation) are collectively analyzed to estimate the location of the external component 102. The orientation of the mobile phone 103, in particular, is measured and analyzed because the value of the measured signal characteristics (e.g., signal strength) of the direct wireless link 170 could be affected by the orientation of the mobile phone 103 at the time of measurement. As such, due to the need to precisely locate the external component 102, the determined orientation of the mobile phone 103 is analyzed simultaneously with the measured direct wireless link characteristics and positions of the mobile phone.

To gather the plurality of multivariate wireless data points, the mobile phone 103 (i.e., the wireless device locator logic 162) instructs the user 166 to move around the spatial region 165 with the mobile phone 103. Movement of the user 166 in response to instructions provided at/by the mobile phone 103 is generally represented in FIG. 2B by arrow 172. Further details of the instructions provided by the mobile phone 103 are provided below with reference to FIG. 3B.

As the user moves around the spatial region 165 in response to the instructions provided at/by the mobile phone 103, the mobile phone 103 periodically or continuously records its position, orientation, and characteristics of the direct wireless link 170. Each recording generates one of the multivariate wireless data points. The mobile phone 103 may make use of any or all available sensors, such as the camera 145, the one or more orientation sensors 142 (e.g., accelerometer, gyroscope, magnetometer, etc.), GPS receiver 149, wireless transceiver 140 (e.g., Wi-Fi, Bluetooth®), and/or other sensors to record the position and orientation. The wireless signal characteristics are recorded using the appropriate antenna (e.g., antenna 141) for the direct wireless link (e.g., 2.4 GHz antenna for Bluetooth®) as well as any other appropriate sensors. Each recording of wireless signal characteristics is paired with the device's position and orientation at the time those signal characteristics were recorded to form the multivariate wireless data points.

After the mobile phone 103 (i.e., the wireless device locator logic 162) performs a period of data collection to obtain a plurality of multivariate wireless data points, the mobile phone 103 will utilize a plurality of multivariate wireless data points to either determine probable location(s) for the external component 102 or optimal search vector(s) to obtain additional multivariate wireless data points. That is, the mobile phone 103 determines whether an estimated location can be determined from the collected multivariate wireless data points, or whether additional multivariate wireless data points are needed. This decision may be a weighted decision depending on how much data has been collected, estimated location and/or size of the area in which the estimated location could be located, the proximity of the user to the estimated location area, etc.

If the mobile phone 103 determines that additional multivariate wireless data points are needed, the mobile phone 103 may determine optimal search vector(s) (i.e., the optimal position(s) and orientation(s) for further measurements) and, as such, can instruct the user to move the mobile phone 103 in a direction which will improve the estimation of the location of the external component. The mobile phone 103 continues recording position, orientation and wireless signal characteristics during this time. After another period of data collection, the mobile phone 103 re-evaluates whether it has sufficient data to locate the external component 102. The mobile phone will continue to collect multivariate wireless data points until a determination is made that the mobile phone 103 can generate an estimate of the location of the external component 102 (i.e., the decision on where to guide the user will be re-evaluated every iteration of the algorithm, although steps will be taken to ensure that the user is not given constantly-changing instructions).

When the mobile phone 103 has collected a sufficient number of multivariate wireless data points, the mobile phone 103 uses the collected multivariate wireless data points to estimate a probable location of the external component 102. More specifically, the mobile phone 103 employs an artificially intelligent search algorithm (such as a particle filter algorithm) to locate the external component 102. In certain embodiments, the artificially intelligent search algorithm is run on (executed by) the mobile phone 103 (i.e., the algorithm is part of the wireless device locator logic 162). However, in other embodiments, the mobile phone 103 may transmit some or all of the recorded multivariate wireless data points to a different device which performs some or all of the algorithm. It is also to be appreciated that multiple devices may be used to run the algorithm.

In general, the artificially intelligent search algorithm processes the plurality of multivariate wireless data points (i.e., the paired wireless signal characteristics, position, and orientation information). By analyzing the signal characteristics at different positions and orientations, the artificially intelligent search algorithm determines an estimated spatial point at which the external component 102 is most likely located (i.e., the probable location of the external component).

After the artificially intelligent search algorithm has determined an estimated location for the external component 102, the mobile phone 103 provides "directional instructions" to the user 166. As described further below with reference to FIG. 3C, "directional instructions" are explicit/clear directions that guide the user around the spatial region (e.g., guide the user to collect more data (not necessarily moving towards the external component) or guide the user 166 to the estimated location of the external component 102). The instructions are generated on the fly and, in general, are intended to be intuitive to the user in that the instructions do not require the user to interpret raw or processed data (i.e., the instructions themselves are generated based on interpretations of the collected multivariate wireless data points where the interpretation is performed by the algorithm). However, as described further below, the directional instructions provided by mobile phone 103 to the user 166 can take a number of different forms, but is generally illustrated in FIG. 2C by arrow 174.

As the user 166 moves towards the estimated location of the external component 102, the mobile phone 103 continues capturing wireless signal characteristics, position, and orientation information. The artificially intelligent search algorithm may be periodically re-run with the new information to improve/refine the accuracy of the estimated location of the external component 102. The updated estimated location is, in turn, then used to update the directional instructions guiding the user 166.

When the external component 102 is found, the primary wireless device search process is terminated. The search process may be terminated by the user or automatically terminated by the either the external component 102 or the mobile phone 103. For example, the external component could automatically terminate the search process when it detects that the external coil 106 is connected to the implantable coil 122.

As noted above, the primary wireless device search process of FIGS. 2A-2C generally includes several stages/phases in which the mobile phone 103 provides instructions, notifications, or other search information to the user 166. The search information may be communicated to the user 166 via one or more of visual, audible, tactile, or other types of indicators on the mobile phone 103. FIGS. 3A, 3B, and 3C illustrate examples in which search information is provided to the user 166 via display screen 150 of the mobile phone 103.

Referring first to FIG. 3A, shown is a visual display 180(A) that may be provided to the user 166 via display screen 150. In this example, the mobile phone 103 generates and displays an augmented reality view of the spatial area 165. More specifically, using input devices of the mobile phone 103, such as the camera 145, orientation sensors 142, etc., the mobile phone 103 generates and displays an enhanced live direct or indirect view of the real-world environment of the spatial region 165. In this example, the live direct or indirect views of the spatial region 165 is augmented with superimposed computer-generated search information 182(A). The search information 182(A) in the example of FIG. 3A is a message stating "Device Connected," which indicates to the user 166 that the mobile phone 103 is wirelessly connected to the external component 102 and, as such, the user 166 is located in the same spatial region 165 as the misplaced external component. The visual display 180(A) could be displayed to the user 166, for example, at the beginning of the primary wireless device search process and subsequent to a preliminary device search process, if performed.

As noted above, during the primary wireless device search process the mobile phone 103 can instruct the user 166 to move about the spatial region 165. In certain examples, the user movement instructions may be directional directions (e.g., "walk forwards," "turn left," "turn right," "take five steps," etc.). In other examples, the mobile phone 103 may or may not specify a particular direction for the user to move, depending on, for example, the algorithm being used or other parameter.

FIG. 3B illustrates an example visual display 180(B) that may be provided to the user 166 via display screen 150 to instruct the user to move about the spatial region 165. In this example, the visual display 180(B) is an augmented reality view of the spatial area 165 that includes search information 182(B) comprising a three-dimensional (3D) directional arrow 183 and text 184 instructing the user 166 to "Follow the Arrow." In this example, during the data collection phase (i.e., while the mobile phone 103 obtains the multivariate wireless data points), the directional arrow 183 may change directions so that the user 166 follows a selected path through the spatial area 165. It is to be appreciated that the directional arrow 183 is illustrative of one type of directional instructions that may be provided to the user and that other types of directional instructions may be presented using augmented reality to aid the user experience. For example, instead of the directional arrow 183 an augmented reality display could show a selected path for the user overlaid on the camera input with text instructing the user 166 to "Follow the Path" or the like.

As noted above, the user 166 moves about the spatial region 165 as instructed by the mobile phone 103 to gather the multivariate wireless data points. When a sufficient amount of data has been collected, the mobile phone 103 (or other device) executes an artificially intelligent search algorithm to estimate the location of the external component 102 in the spatial region 165 using the collected multivariate wireless data points. Once this location is estimated, the mobile phone 103 provides the user 166 with additional search information indicating the estimated location of the external component 102 and/or directional instructions guiding the user to the estimated location.

For example, FIG. 3C illustrates an example visual display 180(C) that may be provided to the user 166 via display screen 150 to identify the estimated location and to guide the user thereto. In this example, the visual display 180(C) is an augmented reality view of the spatial area that includes search information 182(C) comprising a three-dimensional (3D) directional arrow 185, text 186 instructing the user 166 to "Follow the Arrow," and an indication 181 of the estimated location for external component 102. The indication may comprise a visual or non-visual indication (e.g., sound, such as spoken voice, haptic feedback using a vibration motor, etc.) In one specific example, the indication 181 comprises a displayed representation of the external component 102 and a "sphere" or other shape surrounding the estimated location. The size, shape, color, etc. of the indication (i.e., the size of the sphere) could change (e.g., shrink, change center, etc.) as the estimated location of the external component 102 is updated.

Collectively, the directional arrow 185, text 186, and the indication 181 form an example of the directional instructions that are provided to the user 166. In this example, as the user 166 moves towards the estimated location, the directional arrow 185 and indication 181 may change or adjust as the estimated location is updated (as described above), so that the user 166 follows a selected path, so that user avoids identified obstacles, etc. It is to be appreciated that the directional arrow 185, text 186, and indication 181, are illustrative of one specific set of directional instructions that may be provided to the user 166 and that other types of directional instructions may be presented using augmented reality to aid the user experience. For example, instead of the directional arrow 185, an augmented reality display could show a selected path for the user overlaid on the camera input with text instructing the user 166 to "Follow the Path" or the like.

181181As noted, in accordance with embodiments presented herein, the mobile phone 102 provides the user with directional instructions (e.g., arrow 183 and text 184 in FIG. 3B or directional arrow 185, text 186, and indication 181 in FIG. 3C) that guide the user around the spatial region. In general, the directional instructions are intended to indicate, for example: a proximity of the estimated location of the external component 102 relative to the user, a direction to the estimated location of the external component 102 relative to the user, selected vector(s) for the user's movement, desired areas for user to move to (either possible location of device or search area for collecting data points), and/or importance of area (probability of a region containing the lost device, or usefulness of data points from that area for algorithm). These various indications can be provided to the user in a number of different manners.

As described elsewhere herein, text instructions and icons (e.g., crosses, arrows, etc.) can guide the user, either as accompanying text or superimposed on the environment. In addition, also as described elsewhere herein, the proposed path for the user to follow/traverse can be presented to the user (e.g., a line of light overlaid on the environment for the user's footsteps to follow). In a further embodiment, a spherical volume enclosing the estimated location of the external component 102 may be provided as a visual indication to the user (i.e., indicating the space in which the external component is believed to be located). In one example, the spherical volume visually displayed to the user may correspond to the smallest spherical volume which encloses 80% of the particles in a particle filter algorithm. As the algorithm progresses, the particles will be grouped closer together and the sphere shrinks to represent this convergence of the particles. In this example, the sphere's center could move to track the (possibly weighted) midpoint of the particles.

In another embodiment, a color indicator may be used to provide information to the user, where the color of the color indicator may change to indicate one of several things. For example, the color of the color indicator could change to indicate that the user has moved close to (or within) the estimated region containing the external component. The color of the color indicator could also change to indicate the maturity of the algorithm, after a number of cycles through the algorithm (e.g., turning green after 5 cycles) or after the algorithm predicts a particular volume with sufficient certainty (e.g., turning green after 90% of the particles fall within a volume of 1 cubic meter ($m^3$). In other embodiments, flashing visual elements may be provided on a display to indicate similar information.

In various embodiments, the shape of the indicators could change depending on region dimensions and/or opacity/transparency and blur/diffuse effects can be used to vary importance of indicators and icons or to allow user to see "through" some visual elements.

The above examples have primarily been described with reference to use of a mobile phone to locate the external component 102. However, it is to be appreciated that the process could also operate in reverse where the external component 102 is used to locate the mobile phone 103. In such examples, the external component 102 is configured to provide the user 166 with: (1) instructions that guide the user 166 about the spatial region to obtain the plurality of multivariate wireless data points and (2) instructions that guide the user 166 to an estimated location of the mobile phone 103. The instructions may be communicated to the user 166 via one or more of visual, audible, tactile, or other types of indicators via the external component 102. The artificially intelligent search algorithm could be run on external component 102, the mobile phone 103, or another device (i.e., the external component 102 could wirelessly send the plurality of multivariate wireless data points to the mobile phone or other device).

In another embodiment, the user could also have a tertiary device (a beacon or another phone) to coordinate the search process. In such examples, the external component 102 and/or the mobile phone 103 could share the information each of them gets from their sensors and the algorithm will use the accumulated data to help locate the external component 102.

As noted above, the location of a misplaced primary wireless device, such as external component 102 in the above example, is estimated using a plurality of multivariate wireless data points that are processed by an artificially intelligent search algorithm. The algorithm can be referred to as being "artificially intelligent" because it analyses the multivariate wireless data points intelligently and generates decisions autonomously. In addition, training models could be used for the search algorithm and the generation of instructions.

As noted, the artificially intelligent search algorithm analyzes the multivariate wireless data points and determines a likely location for the external component. In addition, the artificially intelligent search algorithm results in the generation of instructions (based on the multivariate wireless data points) that guide the user. Other location techniques may perform some simple processing of the data before presenting it to the user (such as displaying a scale of near/far instead of raw signal strengths), but they rely on the user to interpret the location of the lost device and work out how to reach that location.

In accordance with embodiments presented herein, the directional instruction generation is also artificially intelligent because it translates the output of the algorithm into an action that can easily be understood by humans. As with the search algorithm, the instruction generation engine could be designed in whole or in part through the use of a training model.

In one example, the instruction generation process would work as described below. In this example, the "instruction generation engine" refers to the part of the code (e.g., on the mobile phone) which is responsible for generating instructions, while the "search engine" in this example is the part of the code (algorithm) used to analyze the multivariate wireless data points and determine an estimated location for the external component (i.e., determine areas where the lost device might be located). In certain examples, the instruction generation engine and the search engine may form part of the "artificially intelligent search algorithm."

First, the search engine completes a cycle, which results in the determination of one or more areas where the lost external component could be located. The completion of the first cycle also provides the mobile phone with a certain amount of information about the environment. Second, the instruction generation engine analyzes the output of the search engine to determine where the user should go (i.e., whether the user should move towards an area where the lost external component might be, or move in a way that generates more useful data, or some intermediate path that serves both purposes). This analysis is performed using a mathematical model which may be wholly or partly pre-programmed and may be wholly or partly generated through the use of a training model.

The instruction generation engine may also vary internal parameters and weightings based on the output of the search engine, and based on previous instructions. Thus, the instruction generation engine is stateful, meaning its output depends on the output of previous iterations of both the search engine and instruction generation engine, as well as the current iteration of the search engine. This means that the instruction generation engine can be consistent and provide smooth transitions between instructions instead of fluctuating wildly multiple times every second.

Next, the instruction generation engine compares the user's current location to the desired location generated above. The engine then determines the path that the user must follow to reach that location using a path-finding algorithm that may be preprogrammed or trained. The instruction generation engine translates the desired path into easily understandable directional instructions (such as an arrow, a path drawn on the screen, a text instruction, or a combination of these or similar instructions noted above) and the directional instructions are presented to the user.

One example of a search engine/algorithm that may be used in accordance with embodiments presented herein to locate a misplaced primary wireless device is a particle filter algorithm. Provided below is a simple description of one example particle filter algorithm that is provided for illustration purposes. It is to be appreciated that the algorithm used in accordance with certain embodiments presented herein not be a particle filter algorithm, or it may be a more complex particle filter algorithm than that described below.

A particle filter algorithm can be used to determine the value of one unknown variable when a related variable can be measured and the relationship between these variables is known. In this example, the unknown variable is the location of the misplaced primary wireless device and the related measured variable is the signal strength of the wireless connection to the misplaced primary wireless device. The relationship between these variables is use of the inverse square law to convert signal strength to range, along with the position and orientation of the secondary wireless device at the point a signal strength is measured. The effects of obstacles, reflections and interference may also be modelled in the relationship between signal strength and range.

Continuing with this example, a set of hypotheses are first generated for the location of the misplaced primary wireless device. These hypotheses are referred to as "particles" and, with no prior information, the initial particles are spread randomly over the entire search area. Next, the measured signal strengths are used to determine the likelihood of each particle being the correct location, depending on how close the particle is to the range represented by that measurement. This likelihood is called particle weight. Next, a new set of hypotheses is generated, with values distributed based on the particle weights from the previous iteration. This process is known as resampling. The resampled points are adjusted to compensate for the user moving between sets of measurement. Signal strength is then measured again and used to weight the resampled, adjusted particles. The process of resampling, adjusting, measuring and weighting is repeated and each iteration clusters the particles closer together, providing a better estimate of the location of the misplaced primary wireless device. When the estimate needs certain criteria, the user can be instructed to move in a certain direction. Meanwhile, the particle filter continues iterating to improve the estimate.

Typically, a particle filter algorithm is used to determine the location of a moving operator relative to a fixed beacon at a known location. However, in the above example, the particle filter is used to locate a fixed beacon relative to a moving operator. As such, the above example illustrates an inverted particle filter algorithm which is different from the typical uses of the algorithm.

It is to be appreciated that examples of FIGS. 2A-2C and 3A-3C are illustrative and that a primary wireless device search process in accordance with embodiments presented herein may take other forms. For example, the example primary wireless device search process described above relies on a human actor to follow the instructions and carry the secondary wireless device. However, the human actor could be replaced by a robot for automated searching. In this case, the instructions presented to the user would be replaced with electronic signals that can be interpreted by the robot.

In another example, the artificially intelligent search algorithm could be used even when the wireless signal is intermittent (e.g., the misplaced primary wireless device wireless signal is being partially shielded by a column, a wall, a fish tank, etc.). In certain such examples, the artificially intelligent search algorithm could pair the signal loss with the position and movement patterns of the user and postulate that there is a shielding obstacle between the primary and secondary wireless devices. The artificially intelligent search algorithm could then use that postulate in the estimation of the location of the misplaced primary wireless device.

For example, the user is to the left of a wall and the wireless signal is no longer detected or very weak. As the user moves north, the wireless signal strength quickly increases (e.g., spikes up). As such, the artificially intelligent search algorithm theorizes that there is a shielding obstacle to the right of the user, and accordingly asks the user to move around the wall, look for openings in the wall (e.g., door, window, etc.). In certain arrangements, the artificially intelligent search algorithm could even ask the user whether there is a wall to the right and, based on the answer provided by the user, adjust operation of the algorithm accordingly.

In further example, a camera or other sensor of the secondary wireless device may be used to detect objects (e.g., a column, a wall, a fish tank, etc.) that could block, reflect, or otherwise affect the measured wireless signal characteristic(s). That is, the secondary wireless device could capture spatial environment information related to (affecting) the measured wireless signal characteristic(s). This spatial environment information related to the measured wireless signal characteristic(s) could be input to the artificially intelligent search algorithm and used to determine the estimated location of the primary wireless device.

In another example, the misplaced primary wireless device could have a more active role and provide the secondary wireless device with auxiliary information for use in the artificially intelligent search algorithm. For example, the misplaced primary wireless device could generate a first list of other/tertiary wireless devices that are within range of the misplaced primary wireless device and record the associated wireless signal characteristics (i.e., signal characteristics for the first set of wireless devices, as detected by the misplaced primary wireless device). The primary wireless device could provide the list of other wireless devices, and associated wireless signal characteristics, to the secondary wireless device. The secondary wireless device could similarly generate a second list of other wireless devices that are within range of the secondary wireless device and record the associated wireless signal characteristics (i.e., signal characteristics for the second set of wireless devices, as detected by the secondary wireless device). The two device lists, and associated wireless signal characteristics as determined at each of the misplaced primary wireless device and the secondary wireless device could be used in the artificially intelligent search algorithm in the estimation of a more precise location for the primary wireless device.

In another embodiment, the misplaced primary wireless device could beep or emit light pulses which could be detected by the camera of the secondary wireless device and used to help locate the primary wireless device. Those beeps or light pulses could be emitted on command, be it initiated automatically by the secondary wireless device or by the user. In still other embodiments, the secondary wireless device (or another device) may be configured to execute image recognition algorithms to generate input data for use by the artificially intelligent search algorithm.

Figure 4A:
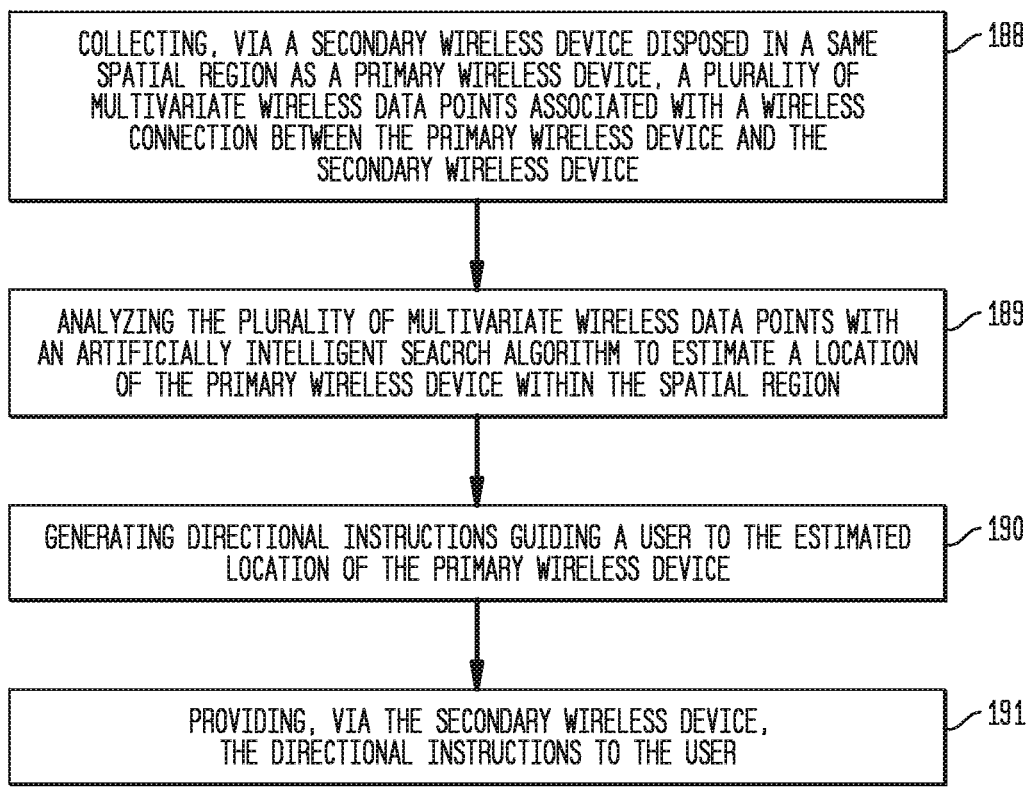
FIG. 4A is a high-level flowchart of a method, in accordance with embodiments presented herein.

FIG. 4A is a high-level flowchart illustrating a method 187 for locating a primary wireless device via (using) a secondary wireless device, in accordance with certain embodiments presented herein. Method 187 begins at 188 where a secondary wireless device disposed in the same spatial region as a primary wireless device collects a plurality of multivariate wireless data points associated with a wireless connection between the primary wireless device and the secondary wireless device. At 189, an artificially intelligent search algorithm analyzes the plurality of multivariate wireless data points to estimate a location of the primary wireless device within the spatial region. At 190, directional instructions guiding a user to the estimated location of the primary wireless device are generated. At 191, the directional instructions are provided to the user via the secondary wireless device. FIG. 4B is a detailed flowchart illustrating further details for one example implementation of method 187 of FIG. 4A. More specifically, FIG. 4B illustrates further details of example operations performed at each of 188 and 191 of FIG. 4A.

More specifically, FIG. 4B first illustrates that, in this example, 188 (i.e., where the secondary wireless device collects a plurality of multivariate wireless data points associated with a wireless connection between the primary wireless device and the secondary wireless device) includes five (5) sub-processes, labeled as 192, 193, 194, 195, and 196. At 192, the secondary wireless device determines whether the primary wireless device and the secondary wireless device are connected by a direct wireless link. As detailed above, this determination may be made automatically by the secondary wireless device, in response to a user input, etc. At 193, the secondary wireless device provides the user with instructions to move about spatial region. At 194, as the user moves about the spatial region, the secondary wireless device records characteristics of the direct wireless link (i.e., signal strength of the direct wireless link between the primary and secondary wireless devices), position, and orientation measurements at a plurality of different points in the spatial region. These measurements generate the multivariate wireless data points.

At 195, a decision is made as to whether the secondary wireless device has recorded enough multivariate wireless data points to locate the primary wireless device. If the secondary wireless device has not recorded enough data points to locate the primary wireless device, the method proceeds to 196 where a determination is made as to selected (e.g., optimal) locations to record additional measurements (i.e., generation of optimal search vector(s) to obtain additional multivariate wireless data points). The method then returns to 193 where the user is instructed on how to move about the spatial region to collect the additional measurements. The steps of 193, 194, 195, and 196 are repeated until a determination is made at 195 that secondary wireless device has recorded enough data points to locate the primary wireless device.

Once it is determined at 195 that the secondary wireless device has recorded enough data points to locate the primary wireless device, the method proceeds to 189 where, as noted above, the plurality of multivariate wireless data points are analyzed with an artificially intelligent search algorithm to estimate a location of the primary wireless device within the spatial region. The method then proceeds to 190 where directional instructions guiding a user to the estimated location of the primary wireless device are generated.

After the directional instructions are generated, the directional instructions are then provided to the user at 191. In the example of FIG. 4B, 191 includes three (3) sub-processes labeled as 197, 198, and 199.

At 197, the secondary wireless device instructs the user to move towards the estimated location of the primary wireless device. At 198, as the user moves towards the estimated location, the secondary wireless device continuously records characteristics of the direct wireless link, position, and orientation measurements. At 199, one or more determination are made as whether or not the primary wireless device been located by the user. If, after the one or more determinations, the primary wireless device has not been located by the user, the method returns to 195 to gather more multivariate wireless data points and/or to re-execute the artificially intelligent search algorithm. The method ends when a determination has been made that the user has located the primary wireless device.

As noted above, presented herein are techniques for using a secondary wireless device to locate a misplaced primary wireless device within a spatial region. The techniques presented herein use the secondary wireless device to measure at least one characteristic (e.g., signal strength) of a direct wireless link between the primary wireless device and the secondary device. Each of the measured characteristics is coupled with the position of the secondary wireless device and the orientation of the secondary device when the at least one characteristic of the direct wireless link is measured. An artificially intelligent search algorithm analyzes the plurality of multivariate wireless data points to estimate the location of the wireless device. The user is then provided with specific directional instructions that guide the user to the estimated location of the primary wireless device. As such, the techniques presented herein are superior to conventional device techniques in that the user is provided with a precise location of a primary electronic wireless device and is guided to the precise location (via explicit directions) without the need for the user to interpret location data. As such, the techniques presented herein remove the cognitive load from the user, making it easier to use than existing technology. In addition, the techniques presented herein do not rely on the primary wireless device transmitting location information to the secondary wireless device nor is there a need for the last known location of the misplaced device (i.e., the techniques presented herein to not rely on previously recorded location information for the lost device).

Although embodiments have been primarily described with reference to cochlear implants, it is to be appreciated that the techniques presented herein may be implemented in other implantable medical devices, such as other types of auditory prostheses.

It is to be appreciated that the embodiments presented herein are not mutually exclusive.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method, comprising:
   collecting, via a secondary wireless device disposed in a same spatial region as a primary wireless device, a plurality of multivariate wireless data points associated with a direct wireless link between the primary wireless device and the secondary wireless device;
   capturing, via one or more sensors of the secondary wireless device, spatial environment information;
   analyzing the plurality of multivariate wireless data points and the spatial environment information with an artificially intelligent search algorithm to estimate a location of the primary wireless device within the spatial region;
   generating directional instructions guiding a user to move about the spatial region to the estimated location of the primary wireless device; and
   providing, via the secondary wireless device, the directional instructions to the user to move about the spatial region.

2. The method of claim 1, wherein collecting the plurality of multivariate wireless data points associated with the direct wireless link between the primary wireless device and the secondary wireless device comprises:
   measuring at least one characteristic of the direct wireless link at a specific spatial point;
   recording an indication of the specific spatial point of the secondary wireless device at a time the at least one characteristic is measured; and
   determining an orientation of the secondary wireless device at the time the at least one characteristic is measured.

3. The method of claim 2, wherein measuring at least one characteristic of the direct wireless link at a location point comprises:
   measuring a signal strength of the direct wireless link.

4. The method of claim 1, wherein providing the directional instructions guiding a user to move about the spatial region comprise:
   displaying, at a display screen of the secondary wireless device, an augmented reality display including the directional instructions.

5. The method of claim 1, further comprising:
   automatically determining that the primary wireless device has been misplaced; and
   automatically initiating the collecting of the plurality of multivariate wireless data points associated with a direct wireless link between the primary wireless device and the secondary wireless device.

6. The method of claim 1, method of claim 1, further comprising:

prior to analyzing the plurality of multivariate wireless data points with the artificially intelligent search algorithm, determining whether a sufficient number of multivariate wireless data points have been collected to generate an estimated location of the primary wireless device.

7. The method of claim 1, wherein analyzing the plurality of multivariate wireless data points with an artificially intelligent search algorithm to estimate a location of the primary wireless device within the spatial region comprises:
analyzing the plurality of multivariate wireless data points at the secondary wireless device.

8. The method of claim 1, wherein analyzing the plurality of multivariate wireless data points with an artificially intelligent search algorithm to estimate a location of the primary wireless device within the spatial region comprises:
providing the plurality of multivariate wireless data points to a third device; and
analyzing the plurality of multivariate wireless data points at the third device.

9. The method of claim 1, wherein providing directional instructions guiding the user to the estimated location of the primary wireless device includes:
providing the user with an indication of the estimated location.

10. The method of claim 1, wherein providing directional instructions guiding the user to the estimated location of the primary wireless device comprises:
displaying, at a display screen of the secondary wireless device, an augmented reality display including the directional instructions guiding the user to the estimated location of the primary wireless device.

11. The method of claim 1, further comprising:
obtaining, a list of a first set of wireless devices that are within range of the primary wireless device and associated wireless signal characteristics for the first set of wireless devices;
obtaining a list of a second set of wireless devices that are within range of the secondary wireless device and associated wireless signal characteristics for the second set of wireless devices; and
analyzing, with the artificially intelligent search algorithm, the first set of wireless devices and associated wireless signal characteristics and the first set of wireless devices and associated wireless signal characteristics to estimate the location of the primary wireless device within the spatial region.

12. The method of claim 1, wherein the primary wireless device is an external component of an implantable medical device.

13. A method, comprising:
at each of a plurality of location points within a spatial region, measuring at least one characteristic of a direct wireless link between a primary wireless device and a secondary wireless device;
at each of the plurality of location points, recording an indication of an orientation and location point of the secondary wireless device at a time the at least one characteristic is measured;
capturing, via one or more sensors of the secondary wireless device, spatial environment information;
generating, based on an analysis of the spatial environment information and the at least one characteristic of the direct wireless link and the orientation of the secondary wireless device at each of the plurality of location points, an estimated location of the primary wireless device in the spatial region;
generating directional instructions guiding a user to the estimated location of the primary wireless device; and
providing, via the secondary wireless device, the directional instructions to the user.

14. The method of claim 13, wherein measuring the at least one characteristic of the direct wireless link at each of the plurality of location points comprises:
measuring a signal strength of the direct wireless link between the primary wireless device and the secondary wireless device at each of the plurality of location points.

15. The method of claim 13, further comprising:
providing, via the secondary wireless device, directional instructions guiding the user to move about the spatial region; and
measuring at least one characteristic of the direct wireless link as the user moves in accordance with the directional instructions guiding a user to move about the spatial region.

16. The method of claim 15, wherein providing the directional instructions guiding a user to move about the spatial region comprise:
displaying, at a display screen of the secondary wireless device, an augmented reality display including the directional instructions guiding the user to move about the spatial region.

17. The method of claim 13, wherein generating the estimated location of the primary wireless device in the spatial region comprises:
analyzing the at least one characteristic of a direct wireless link and the orientation of the secondary wireless device at each of the plurality of location points at the secondary wireless device.

18. The method of claim 13, wherein generating the estimated location of the primary wireless device in the spatial region comprises:
providing the at least one characteristic of a direct wireless link and the orientation of the secondary wireless device at each of the plurality of location points to a third device; and
analyzing the at least one characteristic of a direct wireless link and the orientation of the secondary wireless device at each of the plurality of location points at the third device.

19. A method, comprising:
collecting, via a secondary wireless device disposed in a same spatial region as a primary wireless device, a plurality of multivariate wireless data points associated with a direct wireless link between the primary wireless device and the secondary wireless device;
measuring at least one characteristic of the direct wireless link at a specific spatial point;
recording an indication of the specific spatial point of the secondary wireless device at a time the at least one characteristic is measured;
determining an orientation of the secondary wireless device at the time the at least one characteristic is measured;
capturing, via one or more sensors of the secondary wireless device, spatial environment information;
analyzing the plurality of multivariate wireless data points and the spatial environment information with an artificially intelligent search algorithm to estimate a location of the primary wireless device within the spatial region;
generating directional instructions guiding a user to the estimated location of the primary wireless device; and providing, via the secondary wireless device, the directional instructions to the user.

20. The method of claim 19, wherein measuring at least one characteristic of the direct wireless link at a location point comprises:
measuring a signal strength of the direct wireless link.

* * * * *